Nov. 10, 1964 C. H. JACOBY Re. 25,682

METHOD OF WELL COMPLETION

Original Filed April 20, 1959 2 Sheets-Sheet 1

INVENTOR:
CHARLES H. JACOBY
BY:
Beau, Brooks, Buckley & Beau,
ATTORNEYS.

METHOD OF WELL COMPLETION

Original Filed April 20, 1959 2 Sheets-Sheet 2

INVENTOR:
CHARLES H. JACOBY
BY:
Beau, Brooks, Buckley & Beau,
ATTORNEYS.

United States Patent Office

Re. 25,68

Reissued Nov. 10, 19

25,682

METHOD OF WELL COMPLETION

Charles H. Jacoby, Dearborn, Mich., assignor to The International Salt Company, Inc., Scranton, Pa.

Original No. 3,064,957, dated Nov. 20, 1962, Ser. No. 807,449, Apr. 20, 1959. Application for reissue Jan. 22, 1964, Ser. No. 350,929

7 Claims. (Cl. 299—4)

Matter enclosed in heavy brackets [ ] appears in the original patent but forms no part of this reissue specification; matter printed in italics indicates the additions made by reissue.

This invention relates to the mining of liquid-soluble minerals from underground strata, and more particularly to the solution mining of salt. It is well known that soluble mineral deposits may be recovered by the drilling of wells into the mineral strata, fracturing the strata to open a passageway from one well to another and then circulating a mineral solvent through the opened underground system. Such a system of interconnected wells and cavities is referred to as a gallery. It is also well known in the art that the solution mining of salt has particular difficulties due primarily to the fact that when water is pumped into a well drilled into a salt formation the fresh water will tend to rise and the brine-saturated water remains near the bottom of the cavity. As a result the formed cavity develops primarily upwardly and only secondarily laterally. This condition is further developed by reason of the insoluble impurities in the salt deposit falling out of the brine solution and forming a semi-porous insoluble blanket on the floor and to some degree, the walls of the cavity. It is of course obvious that in order to obtain any worthwhile amount of salt under these circumstances it is necessary to drill the well to the bottom of the salt strata and even then a great deal of the deposit will be wasted. Because of the aforesaid conditions it was a natural development to utilize the gallery system for solution mining of salt, and this is discussed in a number of letters patents, examples of which are Patents 1,960,932 to Tracy, 2,487,202 to Pullen and 2,850,270 to Hanson.

It is a primary object of the present invention to provide an improved method for "completing" a well driven into and through an underground strata of mineral to be recovered by the dissolution mining process.

A specific object of the present invention is to provide an improved method of sealing off a well that has been driven through a salt bed and into the strata therebelow so that the subsequent fracturing or splitting operation will be limited to within the salt bed while still being confined to the lower level thereof.

Another object is to provide an improved method for sealing the well in relation to the strata above and below the bed to be mined, by means of an improved concrete sheath and seal.

Still another object of the invention is to so locate and complete drilled wells which are to be interconnected so as to secure improved results in the mining operation by more efficient use of the liquid solvent circulated through the gallery system.

Other objects and advantages of the invention will appear in the specification hereinafter and in the drawings wherein.

Figure 1:
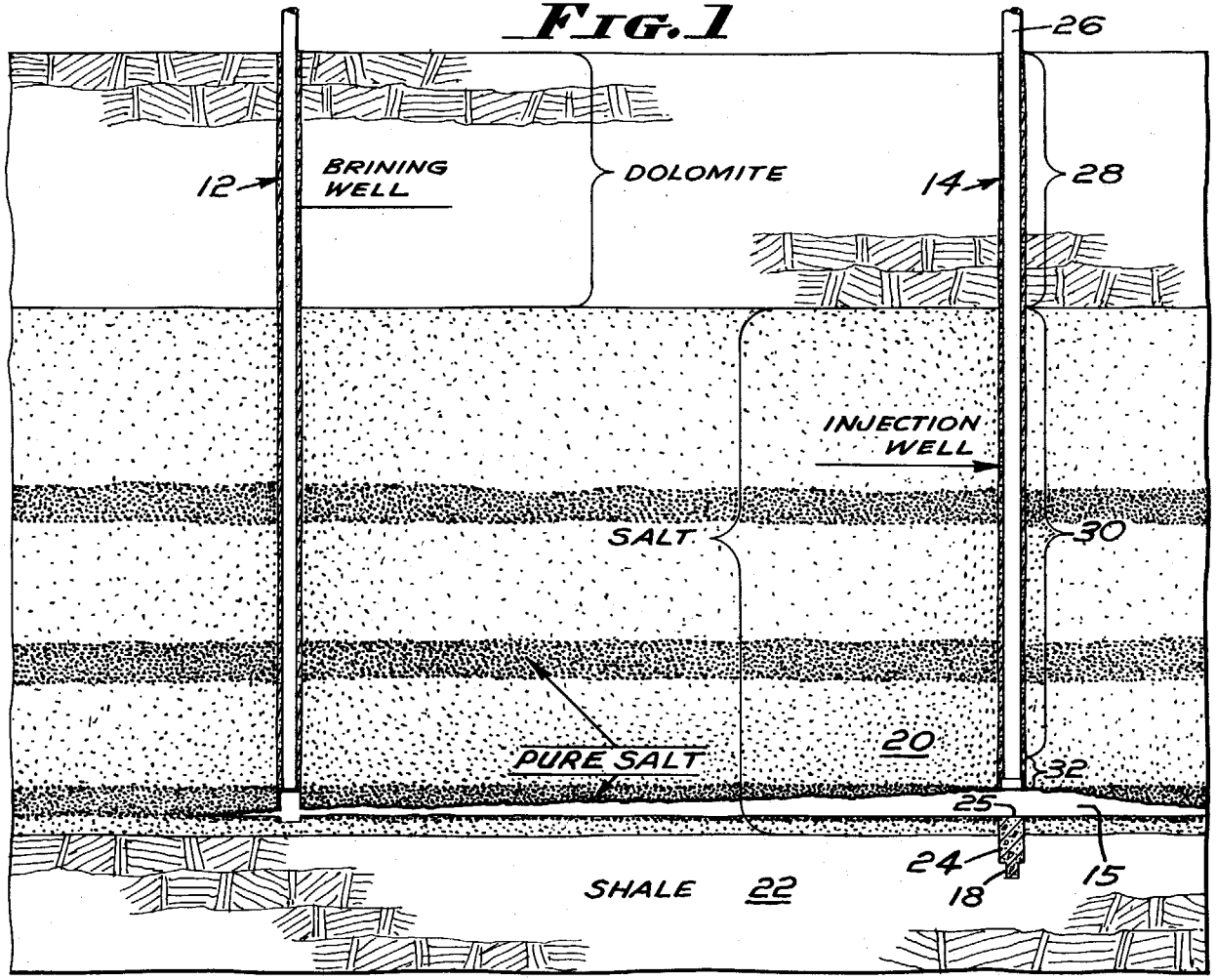
FIG. 1 is a diagrammatic vertical sectional view taken through strata including a salt bed to be mined by circulation of water through an injection well and fractured strata to the production well.

Referring now to FIG. 1, a target well 12, and injection well 14 have been drilled into a salt strata and an und ground connection has been effected as by splitting a uplifting the salt bed as indicated at 15, thereby establi ing a gallery for the purpose of solution mining throu interconnected wells. In accordance with my impro method, the injection well 14 is drilled and completed follows:

I prefer to use a rotary drill for sinking the hole cause I believe it allows a better bond between the w rock and the cement sheath which is provided around well casing, as will be described hereinbelow, by lessen the possible number of air and water entrapment vo created by a rough wall and eliminates a major port of the detrital slough which is created by running cas in a rough-walled hole. Such slough rock will tend follow the casing down the hole and will often fo partial or total blockages in the annulus between the h wall and casing. Usually a 12" to 15" diameter hol desirable and the hole 14 will be started with the propriate rotary bit. As it is desirable to have accur knowledge of the location of the bottom of the salt str and the composition of both the salt strata and the jacent rock formation, when a point approximately feet above the calculated "top of salt" is reached, may use a 6½" core bit to core through all the ma salt stratum and into enough of the underlying str to determine its exact nature. Alternatively, it would less accurate but also less expensive if the normal h were continued and logged by some geophysical me such as gamma ray logging.

Figure 2:
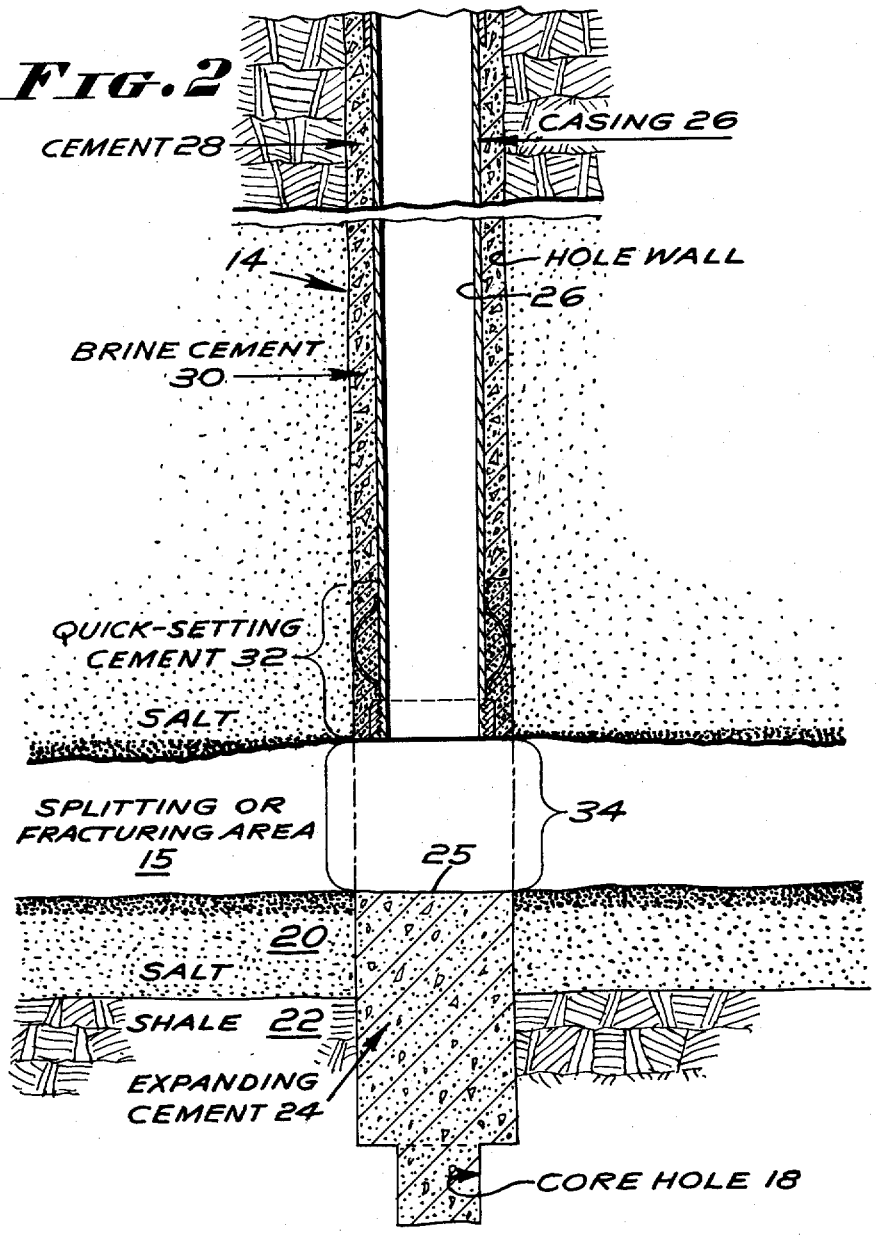
FIG. 2 is a fragmentary sectional view, on enlarged scale, taken as indicated at II—II of FIG. 1, showing the lower portion of the completed well in more detail.

I have found that improved cavity and gallery for tion is obtained by confining the well-interconnect split to the salt strata. This is because the rock for tions underlying salt deposits, although not necessa soluble, are in general, much more permeable horizon ly than the salt. An uplift in these planes would al considerable and possibly total loss of injection fl Accordingly, when the above mentioned coring is finis the hole is drilled on down approximately three into the rock underlying the salt and the hole is t plugged back, preferably with a suitable expand cement 24, to a point about two feet above bottom salt, as indicated at 25. This will effectively seal off hole from the underlying rock. The casing 26 is t run into the hole and set to within about two feet the top of the plug as shown in FIG. 2. The dimensi given are respesentative only. The specific meas ments will depend upon the actual rock and salt co tions found at each particular well site. I select a z within the lower portion of the salt strata which is pure and as free of insolubles as possible. The lo tensile strength of the pure salt and the greater solubi thereof will aid in the splitting of the bed and subsequ wash-through operations. In any case the gap betw the end of the casing and the plug in the hole bottom be kept as small as practicable because this will be point of application of the splitting fluid pressure. point of application of the splitting and uplifting press is confined to as small a vertical portion of the hol possible because this reduces the possibility of caus multiple horizontal fractures within the same salt bed. two or more independent partings occur, the volume fluid required to complete a fracture to the point of in section with the target well will be greatly increased, proper development of the cavity during mining may impaired. Given a small wall area exposed to split pressure, salt deposits may be horizontally split and lifted much more satisfactorily than most rock for tions because of the low tensile strength of the salt because its bed planes generally run evenly horizonta After the core hole 13 and main hole 14 have b plugged back and the casing set, the next step is ablish a cement sheath around the outside of the ing to fill the annular space between the casing and hole wall. The cement sheath serves to reinforce casing, insulate the casing against corrosive influences h as ground waters which in many locations often tain considerable amounts of hydrogen sulphide and monia together with other corrosive salts, and to seal the hole above the lower end of the casing against sible vertical fracturing when the splitting pressure ntroduced, and against vertical escape of injection d alongside the casing during wash-through operations. n order to obtain the best possible sealing effect it lesirable to have the cement sheath devoid of any cks or fissures and to have the sheath bonded to the ounding rock. I have found the following improved hod of cementing the well to provide an excellent shed sheath. The cement is placed by pumping it the casing and the cement reaching the bottom of well will be forced upwardly around the outside of casing. Since the material first pumped into the ng will be that which ultimately fills the space be- en the casing and the wall rock around the upper or of the well as indicated at 28, the first cement in- ed into the casing is preferably regular Portland ent mixed with fresh water. The fresh water cement ollowed by a batch of brine-based cement which will vide an improved sheathing of the lower end of the ng in the salt strata as indicated at 30, because water- d cements will not bond with "salts" whereas the e based cement will bond with the beds of salt and ydrite. Fine granulated salt is mixed with the brine- d cement in proper amounts depending on rock peratures, the temperature of the brine at the mixing t and the ground water conditions immediately above salt sections, to maintain the brine in the saturated . At the final stage of cementing, 2% by weight alcium chloride is added to the cement which will th the lower-most end of the casing as indicated at so as to cause this portion of the cement to setup harden before the major portion of the cement above As soon as the calcium chloride containing portion e cement sheath has set the cement in and under the of the casing is drilled out down to the expanded ent plug 24 in the hole bottom and an expansion ner is used to remove the rest of the concrete from nd the hole wall, from the bottom point of the g to the top of the plug, thus leaving the salt wall sed over this area as indicated at 34. This is the t to be subjected to splitting pressure.

lternatively, before cementing, water, gravel or other erial may be placed in the hole bottom to form a pad pacer. This pad will keep the cement from filling the e gap between the casing and the bottom plug and, removed after cementing is completed, will leave lesired area of the salt wall exposed. Of course any vn method may be used to expose desired areas of alt deposit to the splitting media by perforating the ent sheath or the sheath and casing.

e use of the quick setting cement mixture at the lower on of the well provides two important advantages. , by permitting the cement at the bottom of the casing drilled out as described, while the rest of the cement th is still plastic or semi-liquid, the sheath is not ct to vibration cracks which often result when the th has hardened before the drilling-in takes place. is prevented by the hardened lower portion of nt backing up the still plastic sheath. Secondly, a iderable amount of waiting time, and the attendant ng and personnel cost, is saved.

laim:

The method of completing a well driven through burden into a salt deposit overlying a non-salt de- , said method comprising backplugging the well with nding cement to the elevation of the bottom of the area to be subsequently split, running a casing into the well to the top of said area, pumping water-based cement into said casing in a quantity sufficient to fill the space between the casing and said overburden, then pumping into said casing a supply of brine-based cement sufficient to fill the space between the casing and the upper portion of the salt deposit above said area, then pumping into said casing a supply of calcium chloride containing cement sufficient to fill the remainder of the space between the casing and the salt deposit, and then after said calcium chloride containing cement is set and before the balance of said cement is set reaming out the cement at the splitting area to expose the salt strata thereat.

2. The method of completing a well driven through overburden into a salt deposit and an underlying non-salt deposit, said method comprising backplugging the well with expanding cement to the elevation of the bottom of the salt section to be fractured, running a casing into the well to the top of said section, pumping unset cement into said casing in a quantity sufficient to fill the space between the casing and said overburden, then pumping into said casing a supply of brine-based cement sufficient to fill the space between the casing and the upper portion of the salt deposit above said section, then pumping into said casing a supply of calcium chloride containing brine-based cement sufficient to fill the remainder of the space between the casing and the salt deposit, and then reaming out the cement at the area to be split to expose the salt strata thereat.

3. In a method of completing a well driven through overburden into a salt deposit for solution mining thereof, the steps of backplugging the well with expanding cement to the elevation of the bottom of a salt area to be fractured, running a casing into the well to the top of said area, pumping unset cement into said casing in a quantity sufficient to fill the space between the casing and said overburden and the upper portion of said salt deposit, then pumping into said casing a supply of cement containing calcium chloride sufficient to fill the remainder of the space between the casing and the salt deposit, and then after said calcium chloride containing cement is set and before the balance of said cement is set reaming out the cement at the area to be fractured to expose the salt strata thereat.

4. [The method of mining a subterranean soluble salt deposit lying above a non-salt strata, which method includes driving a well through said soluble salt deposit and into the strata therebelow, plugging back the well to a point above the elevation of said non-salt strata and within a relatively pure salt layer, inserting a casing into said well which is of smaller diameter than the well and to a point just above the plug at the well bottom, forcibly introducing a quantity of cement through said casing sufficient to fill the annular space around the casing upwardly from said plug, in which the cement last introduced is quicker setting than the previously introduced cement, cutting away the quick setting cement immediately above said plug to expose a small vertical portion of the salt deposit when the quick setting cement has hardened and while the cement thereabove is still in plastic condition, and then applying a splitting and uplifting pressure within said casing after all of the cement has hardened, preparatory to introduction of a salt solvent fluid into the split area.]

5. The method of mining a subterranean soluble [salt] *mineral* deposit, which method includes (a) driving a well through said soluble [salt] *mineral* deposit and into the strata therebelow, (b) sealing the bottom of the well by plugging back the well to a level within the region of the soluble [salt] *mineral* deposit, (c) inserting a casing into said well which is of smaller diameter than the well and to a point just above the plug in the well bottom, (d) sealing between the casing and well by forcibly introducing cement through said casing to seal between the casing and well upwardly from said plug, (e) cutting away the cement to expose a small vertical portion of said soluble [salt] *mineral* deposit in an area thereof between said plug and the bottom of the casing after the plug and at least a lowermost portion of the cement around the casing has hardened and without disturbing the stated seals at areas either above or below the exposed portion, (f) then applying a splitting and uplifting pressure to said [salt] *soluble mineral* deposit at said exposed portion thereof so that such force is confined solely at the exposed region, preparatory to introduction of a [salt] *soluble mineral* solvent fluid into the split area.

6. The method according to claim 5 wherein the introduction of cement is controlled so that (a) the cement last introduced is quicker setting than the previously introduced cement so that the quick setting cement is disposed within the region of and extends upwardly from the plug, (b) said [salt] *soluble mineral* deposit being exposed after the quick setting cement has hardened but while the cement thereabove is still in plastic condition, (c) the splitting and uplifting force being applied after all the cement has hardened.

7. The method of solution mining [salt] *soluble mineral* which includes the steps of (a) driving a well through a soluble [salt] *mineral* deposit and into underlying strata, (b) sealing the well by introducing cement into said well to form (a) a solid plug upwardly from the well bottom to a point within said soluble [salt] *mineral* deposit and (b) a casing-embracing shel above said plug and extending upwardly through a least a substantial extent of the [salt] *soluble min eral* deposit, (c) cutting away the cement to expose a small vertica area of the [salt] *soluble mineral* deposit just abov the plug after the plug and at least a lowermost por tion of said shell has hardened and without disturb ing the seal in areas either above or below the ex posed portion, whereby the plug and shell are dis continuous only at said exposed portion, (d) and thereafter applying a splitting and upliftin force within the well so as to be confined in its ap plication solely to the exposed portion of the [salt] *soluble mineral* deposit to the exclusion of regior above and below said portions.

References Cited by the Examiner

The following references, cited by the Examiner, are c record in the patented file of this patent or the origin patent.

UNITED STATES PATENTS

| | | |
|---|---|---|
| 1,960,932 | 5/34 | Tracy. |
| 2,847,202 | 8/58 | Pullen. |
| 2,850,270 | 9/58 | Hanson. |
| 2,952,449 | 9/60 | Bays. |
| 2,961,044 | 11/60 | Shell. |

BENJAMIN HERSH, *Primary Examiner.*